(No Model.)
O. P. BRIGGS.
TWISTER AND SPOOLER FOR THE MANUFACTURE OF WIRE FENCING, &c.
No. 298,280. Patented May 6, 1884.
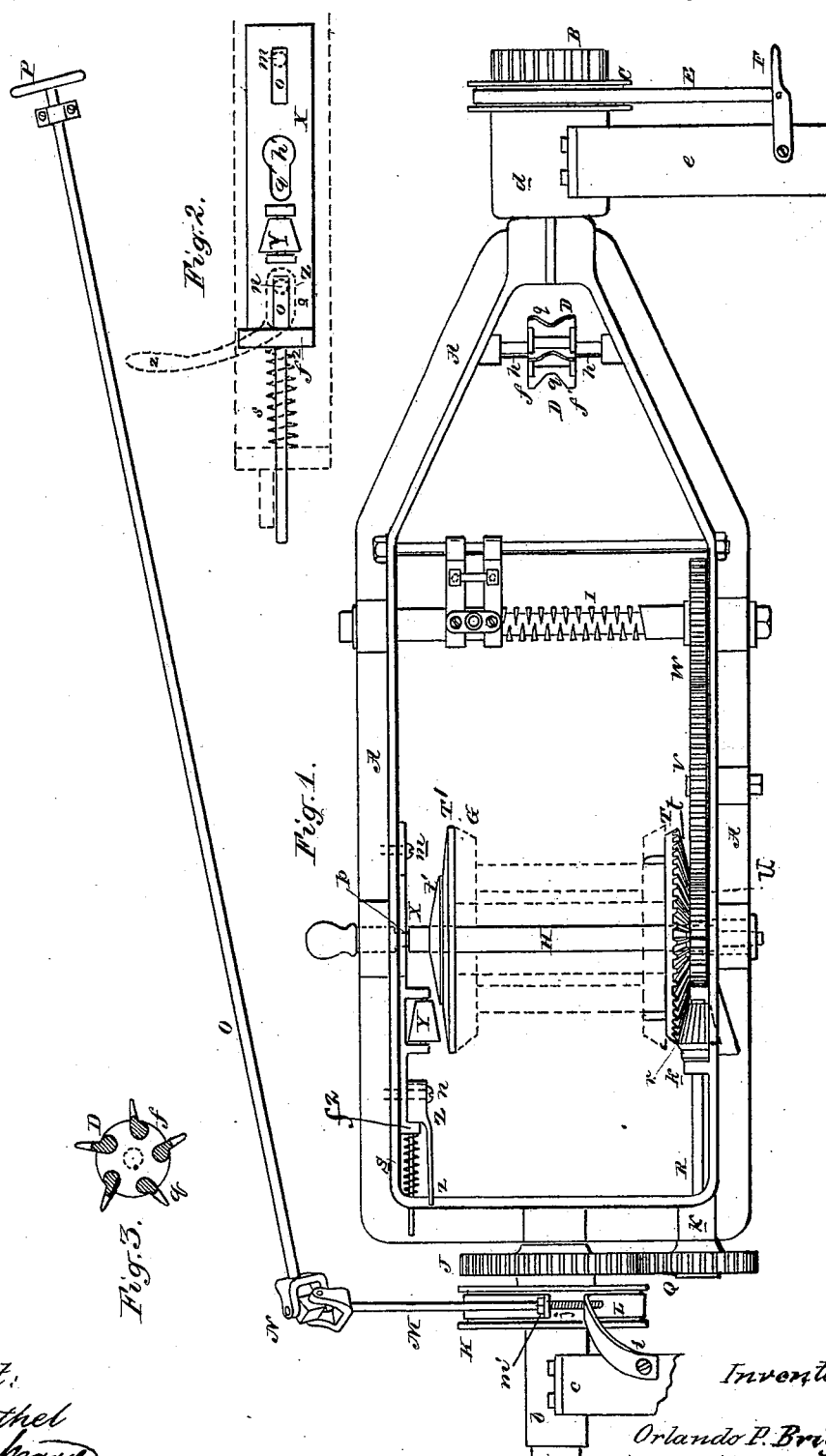

United States Patent Office.

ORLANDO P. BRIGGS, OF CHICAGO, ILLINOIS, ASSIGNOR TO THE THORN WIRE HEDGE COMPANY, OF SAME PLACE.

TWISTER AND SPOOLER FOR THE MANUFACTURE OF WIRE FENCING, &c.

SPECIFICATION forming part of Letters Patent No. 298,280, dated May 6, 1884.

Application filed September 16, 1882. (No model.)

*To all whom it may concern:*

Be it known that I, ORLANDO P. BRIGGS, of Chicago, in the county of Cook and State of Illinois, have invented new and useful Improvements in Twisters and Spoolers for the Manufacture of Wire Fencing, &c.; and I do hereby declare that the following is a full, clear, and exact description thereof, reference being had to the accompanying drawings, which form a part of this specification.

This invention relates to what are known as "twisters" and "spoolers," or devices for twisting or spinning two or more strands of wire together, or around each other, and winding the twisted wire upon a spool, and is especially designed to be employed in the manufacture of wire fencing, although it may be profitably employed in all cases where it is desired to twist two or more strands of wire into a cable and to coil the latter upon a spool.

The invention consists in the novel features of construction and the various combinations hereinafter described and claimed.

Figure 1 is an elevation showing the flier-frame in a vertical position, and with the parts in place and as the whole device appears when ready for use. Fig. 2 is a detail in side elevation, showing the means for securing the spool upon its shaft. Fig. 3 is a central vertical cross-section of the squirrel-wheel.

In the accompanying drawings, A represents the frame of the flier or twister. This may be made of one cast piece, if preferred, with a journal, $a$, mounted to run in the box $b$, which is secured to a suitable post, $c$. The opposite end of the frame is journaled in a suitable box, $d$, on the post $c$. Upon the journal which runs in this box $d$ is secured the pinion B, to which motion is given from any convenient power, and also on said journal, between the pinion and the outer end of the box $d$, is secured the pulley C, which is provided with a band-brake, E, actuated by pressure upon the treadle F.

D is a so-called "squirrel-wheel," consisting of parallel disks $f f'$, connected by notched wings $g$, and provided with trunnions $h$, which have bearing in the opposite arms of the frame A. From the squirrel-wheel the wire passes to a spool represented by dotted lines at G as being mounted upon a shaft, H, transverse to the axis of the frame A. The wire is guided upon the spool by a distributer, I, of familiar construction.

T is one of two opposing disks or plates, between which the spool G is held. Said disk T is locally stationary, or has a permanent position with reference to the frame; or, in other words, has no movement except a rotary one upon its axis. It has a trunnion passing outward through a bearing in one arm of said frame A, and is provided on its outer face with a beveled gear or rack, $t$, with which meshes a corresponding pinion, $k$, belonging to mechanism for rotating the spool. Of such mechanism J is a spur-gear, and K a flanged pulley fixed to a common hub, that is sleeved on the journal $a$, between the bearing-box $b$ and the end of the frame A.

R is a shaft mounted in the frame at right angles to the axis of the spool-shaft, as shown, and provided with the beveled pinion $r$, above referred to as engaging the disk T. On the outer end of the shaft R is the pinion Q, engaging with the spur-gear J.

To secure rotation of the disk T by the connections described, it is necessary to hold the spur-gear J stationary or cause it to rotate at a less speed than that of the frame A. For this purpose a metal friction-band, L, nearly encircles the pulley K, being secured at one end to the upright $c$ at $i$. At the opposite end the band is bent outward, and is apertured to receive the rod M, provided with a fixed nut or shoulder, $m'$. Below this shoulder the rod is screw-threaded to its end, and is fitted to a corresponding hole in the fixed part of the band, as shown. The rod M therefore operates as a clamping-screw, by which the band L may be variably clamped about the said pulley, and be thereby made to hold the latter stationary, or to retard its rotation to any desired extent, and thereby control the movements of the winding spool or disk T. The rod M is here shown as being connected with a second rod, O, by a universal joint, N, said rod O having a hand-wheel, P, above and near the head of the twister, in convenient reach from the point where the operator usually stands. The disk T is provided with a fixed pinion, $u$, from which the screw-shaft of the distributer I is actuated through the pinion W on said shaft and the intermediate idler, V, in a familiar manner. The spool-shaft H is removable, being passed through a suitable aperture in the arm of the frame A, opposite that to which the disk T is attached, and entering a hole or recess in the center of said disk. Said shaft is reduced in diameter to present a neck, $p$, just inside the inner face of the frame A.

T' is the disk opposed to the disk T, for clamping the spool, as above stated. Said disk T' has a central axial aperture, through which the shaft H freely passes, and which allows the disk to adjust itself inwardly against the end of the spool G. On its outer surface said disk has an annular conical elevation, $t'$.

X is a plate mounted on the inner face of the frame adjacent to the disk T' in such a manner as to slide lengthwise thereon. As here shown, the means for thus holding the plate consists of two headed pins, $m$ and $n$, passing through suitable slots, $o$, in the plate and into the frame. The plate is also provided with a hole, $h'$, in place and of size to admit the spool-shaft H. From this hole $h'$ proceeds a slot, $q$, of size to admit the neck $p$ of the shaft H, when the plate is thrust forward, so that, after the insertion of the shaft H, it may be held in place by the plate. An expanding spring, $s$, is arranged to bear against the plate X at the end toward which the slot $q'$ proceeds from the hole $h'$, and a cam, Z, pivoted on the pin $n$ and provided with a suitable handle, $z$, is arranged to bear on a flange or projection, $f^2$, on the plate X, as a means for retracting and holding the plate in opposition to the spring $s$, as clearly indicated in Fig. 2.

In the plate X is journaled a conical roller, Y, having its axis radial to the disk T', and its smaller end directed toward the shaft H. This roller is also in position on the plate to bear against the conical surface $t'$ of the disk T'. When the cam Z is disengaged from the flange $f^2$ by throwing outward the lever $z$, the spring $s$ is free to force the plate X forward, and to thereby give a self-adjusting pressure of the conical roller Y against the disk T' and spool G, through the obvious action of the roller on the conical surface $t'$ of said disk. The spool G is rotated by frictional contact with the disk T under the pressure of the opposite disk; or, if desired, projections may be provided on the disk T to engage with the spool.

It is immaterial whether the shaft H rotates with the disk and spool or not. If it is desired that it shall so rotate, its end may be squared to fit into a corresponding recess in the disk T.

When a filled spool is to be replaced by an empty one, the plate X is retracted by means of the cam Z, as described, and the shaft H is withdrawn, thereby releasing the filled spool. The empty spool is then placed on the disk T, the movable disk T' is placed on the spool, the shaft H is inserted through the frame and spool, and the cam Z is thrown out of engagement with the plate, which brings the roller Y into bearing upon the disk T', as stated.

What I claim as new, is—

1. The combination, with the frame A, of the disk T, and mechanism for rotating the same, movable spool-shaft H, apertured removable disk T', and a self-adjusting friction-roller or presser for forcing the latter disk against the spool, substantially as described.

2. The combination, with the rotating spool-carrying frame A, disk T, and means for rotating said disk, of the opposing disk T', adjustable in the direction of its axis, and having a conical outer surface, a roller arranged to bear on said conical surface, a sliding support for the roller, a spring arranged to force the roller inwardly toward the axis of the disk, and suitable means for retracting the roller, substantially as and for the purposes set forth.

3. In combination with the frame and with the disk T', adjustable as described, the disk T, and a removable spool-shaft, the longitudinally-sliding plate X, roller Y, spring $s$, and cam Z, connected, arranged, and operating substantially as and for the purposes specified.

4. In combination with the twister-frame and removable spool-shaft H, having the reduced part $p$, the sliding plate X, provided with the open slot $q'$, the spring $s$, and the cam Z, arranged and operating substantially as described, and for the purposes specified.

5. The combination, with the rotating spool-carrying frame, spool-holding disks T and T' therein, friction mechanism, substantially as shown, for rotating the disks and spool, and a screw-threaded rod, M, for regulating the friction of such mechanisms, of a rod, O, universally jointed with the rod M, and extended to the head of the twister, substantially as and for the purpose set forth.

ORLANDO P. BRIGGS.

Witnesses:
M. E. DAYTON,
JESSE COX, Jr.